United States Patent
Leventhal et al.

(10) Patent No.: US 7,409,677 B1
(45) Date of Patent: Aug. 5, 2008

(54) METHOD AND SYSTEM FOR CREATION AND USE OF EMBEDDED TRACE DESCRIPTION

(75) Inventors: Adam H. Leventhal, San Francisco, CA (US); Bryan M. Cantrill, San Francisco, CA (US); Michael W. Shapiro, San Francisco, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 655 days.

(21) Appl. No.: 10/990,124

(22) Filed: Nov. 16, 2004

(51) Int. Cl.
*G06F 9/44* (2006.01)

(52) U.S. Cl. .................. 717/130; 717/128; 717/131

(58) Field of Classification Search ............... 717/128, 717/130, 131, 140, 141, 142, 143
See application file for complete search history.

(56) References Cited

U.S. PATENT DOCUMENTS

| | | | | |
|---|---|---|---|---|
| 5,737,521 A * | 4/1998 | Kleber et al. | ................. | 714/45 |
| 5,872,973 A * | 2/1999 | Mitchell et al. | ............. | 719/332 |
| 6,865,692 B2 * | 3/2005 | Friedman et al. | .............. | 714/25 |
| 6,968,546 B2 * | 11/2005 | Lueh | .......................... | 717/158 |
| 7,107,579 B2 * | 9/2006 | Tsai et al. | .................... | 717/127 |
| 2003/0145309 A1 * | 7/2003 | Inamdar | ..................... | 717/118 |
| 2003/0149960 A1 * | 8/2003 | Inamdar | ..................... | 717/118 |
| 2004/0103408 A1 * | 5/2004 | Chilimbi et al. | ............ | 717/140 |
| 2005/0055674 A1 * | 3/2005 | Shidla et al. | ................ | 717/131 |
| 2005/0125777 A1 * | 6/2005 | Calder et al. | ................ | 717/131 |
| 2006/0101419 A1 * | 5/2006 | Babcock | ..................... | 717/130 |

OTHER PUBLICATIONS

Kumar. N et al. "Instrumentation in software dynamic translators for self-managed systems" 1st ACM SIGSOFT workshop on Slef-managed systems p. 90-94. 2004.*

* cited by examiner

*Primary Examiner*—Wei Y. Zhen
*Assistant Examiner*—Matthew J Brophy
(74) *Attorney, Agent, or Firm*—Osha Liang LLP

(57) ABSTRACT

A method of generating an embedded file involving embedding a plurality of probe calls into source code to obtain embedded source code, compiling the embedded source code to generate object code including a probe relocation for each of the plurality of probe calls, post processing the object code to obtain a plurality of modified object code, wherein the plurality of modified object code includes object code containing a no-operation instruction in place of the probe relocation and object code containing probe encoding, and linking the plurality of modified object code to obtain an embedded file, wherein the embedded file includes probe encoding.

16 Claims, 4 Drawing Sheets

METHOD AND SYSTEM FOR CREATION AND USE OF EMBEDDED TRACE DESCRIPTION

BACKGROUND

A tracing framework is a collection of software routines and tools that permit a user to instrument and record the activity of one or more executing programs, including an operating system kernel. Tracing frameworks typically permit users to describe instrumentation requests by naming one or more probes, which are locations of interest that can be used as data-recording sites within an instrumented program. Tracing frameworks also permit users to associate these probes with one or more actions. The actions describe what tracing operations should be performed when the executing instrumented program passes through the probe site (i.e., when a probe triggers). Tracing frameworks typically provide either a defined set of actions at each probe, a set of user-selectable actions, or the ability to execute an essentially arbitrary set of actions composed in a programming language (such as C, C++, or Pascal).

In tracing frameworks that support a programming language for describing actions, tracing operations (in the form of language statements) are compiled into an intermediate form or directly into machine code. The tracing operations are executed when a probe triggers. In tracing frameworks that compile probe descriptions and actions from a programming language into an intermediate form, the compiler is typically implemented as a user application that then communicates the results of the compilation to the operating system kernel where the probe instrumentation is performed. Communication is typically performed using one or more system calls or device driver calls combined with a set of data structures that together form a binary interface between the trace program compiler and the tracing framework instrumentation service.

Because probes are locations of instrumentation within the executing instrumented program, the probes are associated with the implementation and an embodiment of the executing program. The tracing framework actions provide access to data memory associated with the instrumented program. The data memory is arranged into a set of implementation data structures associated with the internal implementation details and artifacts of the instrumented program.

A debugger is another tool that allows inspection of an instrumented program executing under complete or partial control of the debugger. A debugger is distinct from a tracing framework in that a debugger typically provides a mechanism whereby the instrumented program stops executing at instrumented locations of interest and then is inspected by a user of the debugger before subsequently continuing execution. In contrast, a tracing framework typically permits users to perform additional actions only while the instrumented program is executing. Examination of the results occurs after the execution is complete, or in parallel with execution of the instrumented program. Debuggers are similar to tracing frameworks in that both offer a facility whereby the user may view the data memory of the instrumented program and control the format and organization of the memory display.

Currently, any user may trace a program and gather information from the probes. The data traced at those probes may help the user understand the traced program's activity. Typically, probes are associated with specific points in the program's control flow (e.g., function entry, function return, individual machine instructions, etc.) or based on some asynchronous event stream (e.g., from a timer, other machine interrupts, etc.). Though these probes can provide extensive coverage of the traced program, effective use of them may require knowledge of the traced programs inner workings. Having a developer insert probes at specific locations in the traced program provides easily understood information to users tracing the program. The developer is in a unique position to decide the points of interest and their semantic meanings.

SUMMARY

In general, in one aspect, the invention relates to a method of generating an embedded file comprising embedding a plurality of probe calls into source code to obtain embedded source code, compiling the embedded source code to generate object code comprising a probe relocation for each of the plurality of probe calls, post processing the object code to obtain a plurality of modified object code, wherein the plurality of modified object code comprises object code containing a no-operation instruction in place of the probe relocation and object code containing probe encoding, and linking the plurality of modified object code to obtain an embedded file, wherein the embedded file comprises probe encoding.

In general, in one aspect, the invention relates to a system for executing an embedded file comprising a compiler configured to accept embedded source code and generate object code comprising a probe relocation for each of the plurality of probe calls, a post-processor configured to obtain a plurality of modified object code, wherein the plurality of modified object code comprises object code containing no-operation instructions and object code containing probe encoding, a linker configured to link the plurality of modified object code to obtain an embedded file, wherein the embedded file comprises probe encoding, and a tracing framework configured to accept probe encoding of the embedded file and trace the plurality of probe calls based on information in probe encoding.

In general, in one aspect, the invention relates to a computer system for configuring a link aggregation module, comprising a processor, a memory, a storage device, and software instructions stored in the memory for enabling the computer system under control of the processor to embed a plurality of probe calls into source code to obtain embedded source code, compile the embedded source code to generate object code comprising a probe relocation for each of the plurality of probe calls, post process the object code to obtain a plurality of modified object code, wherein the plurality of modified object code comprises object code containing no-operation instructions in place of the relocations and object code containing probe encoding, link the plurality of modified object code to obtain an embedded file, wherein the embedded file comprises probe encoding, and load the embedded file into a process address space and inserting probe encoding into a tracing framework using an initialization routine of the embedded file.

In general, in one aspect, the invention relates to a computer readable medium comprising software instructions to create a 3D GUI, wherein the software instructions comprise functionality to embed a plurality of probe calls into source code to obtain embedded source code, compile the embedded source code to generate object code comprising a probe relocation for each of the plurality of probe calls, post process the object code to obtain a plurality of modified object code, wherein the plurality of modified object code comprises object code containing no-operation instructions in place of the relocations and object code containing probe encoding, link the plurality of modified object code to obtain an embedded file, wherein the embedded file comprises probe encoding, and load the embedded file into a process address space and inserting probe encoding into a tracing framework using an initialization routine of the embedded file.

Other aspects of the invention will be apparent from the following description and the appended claims.

DETAILED DESCRIPTION

Figure 1:
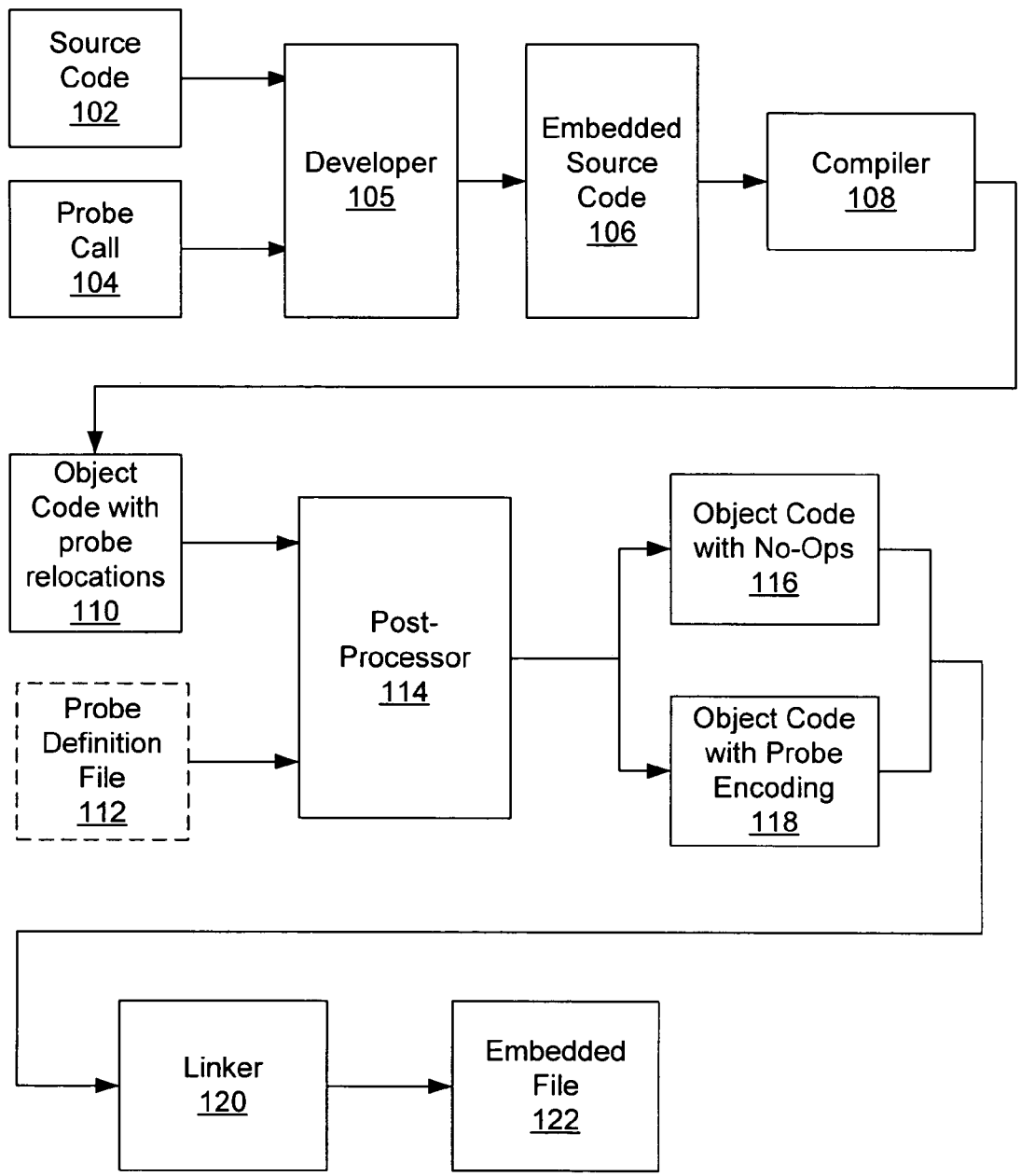
FIG. 1 shows the system for embedding probes into a program in accordance with one embodiment of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

In general, embodiments of this invention provide a method for embedding probe calls into source code, and then generating a binary (e.g., an embedded file), which contains a description of those probes suitable to be entered into a tracing framework, so that framework can then make those probes available to a user. For example, a software developer that knows the inner-workings of a program may insert probe calls in locations that may be useful for a user to trace in order to better understand a program's behavior. Further, the source code with the embedded probe calls is then compiled, post-processed, and linked into a binary (e.g., embedded file), which may contain an embedded description of the probes added by the developer.

Compiling source code with embedded probe calls produces an object file containing relocations which identify the locations of those probe calls. The compiler generates machine code instructions to make a function call; a post-processor uses the relocation information to locate those machine code instructions and replace them with no-op instructions (e.g., instructions that are executed by the processor but have no effect on the machine state). The post-processor also records the locations of the probe calls in a data structure that is embedded into a newly generated object file.

A linker typically combines just the object files generated by the compiler; however, in one embodiment of the invention, the linker combines the object files generated by the compiler with the object files generated by the post processor to create a single binary (e.g., embedded file) which contains the normal contents (e.g., machine code instructions, data, ancillary debugging information, etc.) as well as the embedded description of the probes.

FIG. 1 shows a flow diagram in accordance with one embodiment of the invention. Specifically, FIG. 1 illustrates a system for embedding probes into source code and processing the source code into an embedded file. Initially, source code (102) and probe calls (104) are combined by a developer (105) to create embedded source code (106).

The source code (102) may be generated by a programmer, a computer system, etc., or the source code (102) may be pre-written and obtained from the author or from another provider of the pre-written source code. In one embodiment of the invention, a probe call (104) corresponds to a function call, macro, etc. The probe call (104) typically includes a probe name and one or more associated arguments. Below is an example of source code containing a probe call:

```
void main_look(void)
{
    ...
    query=wait_for_new_query( );
    DTRACE_PROBE2(myserv,         query_receive,
        query→clientname, query→message);
    Process_query(query);
    ...
}
```

In this example, the probe call is made using the DTRACE_PROBE macro. The '2' appended to the DTRACE_PROBE macro signifies the number arguments that are supplied to the probe. myserv is the name of the provider. The provider acts as a grouping of probes. Several probes may belong to the same provider. query_receive is the name of the probe and it takes two arguments, query→clientname and query→message.

The probe call (104) may be embedded at any point in the source code (102) by the developer (105), however it may be preferable to embed the probe call (104) at a specific point of interest. For example, in accordance with one embodiment of the invention, it may be desirable to embed a probe call for a web browser application after an http_request because the corresponding probe will trigger after a request is made to load a web page. In one embodiment of the invention, the arguments of the probe call (104) may correspond to data that the probe requires for tracing. For example, an argument for the probe call for http_request may include a string storing the http address to load.

In one embodiment of the invention, probe calls (104) may be embedded (individually or using a programming tool) into the source code (102) by the programmer that developed the source code (102). The programmer that developed the source code (102) is usually the most familiar with the source code and, therefore, is most likely to know the desirable locations in the source code (102) to embed the various probe calls (104).

In one embodiment of the invention, embedding the probe calls (104) may be an iterative process. Specifically, after a given probe call (104) has been embedded into or deleted from the source code (102), additional source code (102) may be added or deleted. Subsequently, probe calls (104) may then be inserted or deleted. Inserting the probe calls (104) by the developer (105) generates embedded source code (106).

Typically, the embedded source code (106) is written in a high-level programming language, and is in a human readable format. However, the embedded source code (106) needs to be converted into a form that the computer can interpret. Specifically, the embedded source code (106) is converted into object code containing probe relocations (110) (e.g., computer interpretable code) by compiling the embedded source code (106) using a compiler (108). When the embedded source code (106) is compiled, each statement (e.g., high-level instruction defined by the high-level programming language) in the embedded source code (106) is converted into one or more machine code instructions (i.e., object code)

to make a function call(s). In one embodiment of the invention, the object code created by compiling embedded source code (106) contains the relocations to the probe definitions.

In accordance with one embodiment of the invention, a probe definition file (112) may be created to define each probe. The probe definition file (112) may include a keyword, probe, that flags the definition of each probe. Further, in accordance with one embodiment of the invention, the probe definition may include the probe name and the type of each argument. For example, the arguments supplied to a probe may be strings, therefore the probe definition defines the arguments to be of type string. A person of ordinary skill in the art will recognize that this is only one embodiment of the probe definition file, and it may be implemented in other ways (e.g., the probe definition may be defined as a macro, hard coded at the probe location, etc.). Further, the probe definition file is not a requirement for the present invention, however it may simplify the post-processing of the object code with probe relocations. Below is an example of the probe definition file (112).

provider myserv
{
    probe query_receive(string, string);
    probe query_respond( );
}

In this example, the provider, myserv, provides two probe definitions. The two probes are query_receive and query_respond. As discussed above, the keyword, probe, flags the definition for each probe. The types of arguments that a probe takes are placed in parentheses after the probe name. Specifically, query_receive takes two arguments, both of type string. In another embodiment of the invention, the arguments may be another data type (e.g., integer, float, double, etc.). Further, a probe may not take any arguments, as shown by the query_respond probe.

In one embodiment of the invention, the post-processor (114) may accept object code with probe relocations (110) and an optional probe definition file (112). The probe relocations are subsequently removed from the object code with probe relocations (110) using a post-processor (114). The post-processor (114) uses information from the probe relocations (110) to locate those machine code instructions (i.e., the object code with probe relocations 110)) and replace them with a no-op instruction (i.e., a piece of code that results in little or no effect within the system), as described below. The resulting modified object code may be in the form of object code containing no-operation instructions (116) and the object code with probe encoding (118).

Figure 2:
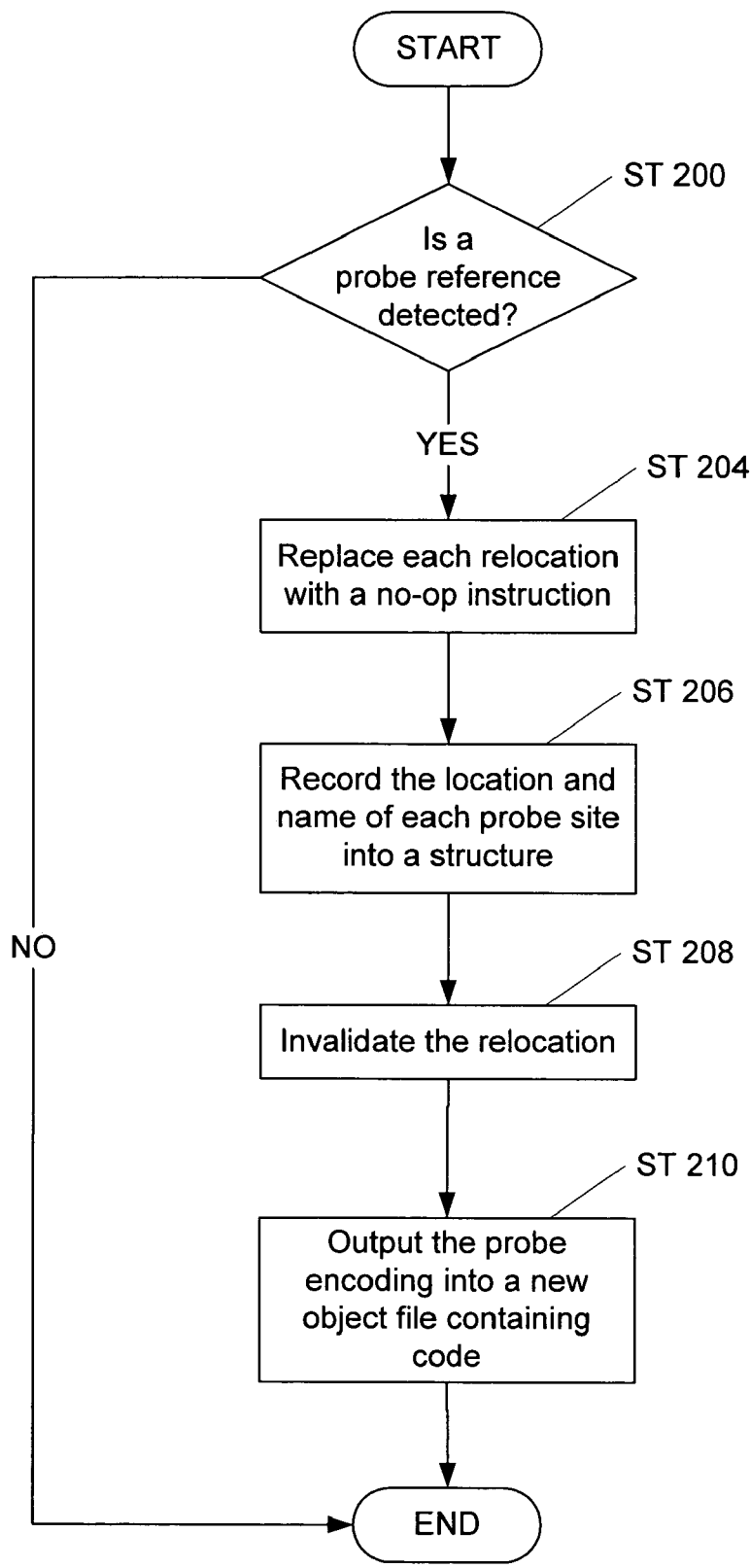
FIG. 2 shows a flowchart for post-processing in accordance with one embodiment of the invention.

FIG. 2 shows a flow chart corresponding to post-processing performed by a post-processor in accordance with one embodiment of the invention. Initially, the probe relocations are detected in each object file with probe relocations (ST 200). Specifically, if a probe relocation is detected, the probe relocation is replaced with a no-operation instruction (ST 204), in accordance with one embodiment of the invention.

If a probe is not enabled, then the no-operation instruction executes instead of the probe code, therefore the no-operation instruction allows the embedded program to run optimally. For example, a web server may provide ten different probes, however, only three probes may be enabled. Therefore, the three probes that need to be monitored are enabled and the other seven probes are not enabled. In accordance with one embodiment of the invention, the code for the seven non-enabled probes are not executed; if one of the seven non-enabled probes triggers, a no-operation instruction is executed allowing the embedded program to run optimally.

The post-processor also stores the probe relocations in a different location (e.g., a separate file). Specifically, when a probe relocation is replaced with a no-operation instruction, the name of the probe and location of the probe relocation (e.g. probe site) are recorded into a data structure (ST 206). The name of the probe and location of the probe relocation are recorded so that when an enabled probe triggers, program control can quickly transfer to the probe. The data structure allows the embedded program to remember where a no-operation instruction was inserted for a probe relocation. Further, the probe relocations in the relocation table are invalidated (ST 208) so the linker does not behave incorrectly when the linker encounters a probe that is not needed.

In accordance with one embodiment of the invention, the post-processor outputs an object file with no-operation instructions in place of probe relocations (ST 210). Further, the post-processor may also output an object file with the data structure containing the name of each probe and the location of each probe relocation, in accordance with one embodiment of the invention. In one embodiment of the invention, this object file may contain code to load the data structure into the system's tracing framework when the embedded program is first loaded into the processes address space. Those skilled in the art will recognize that the invention is not limited to inserting the data structure and initialization code into a separate object file and that other implementations are possible. For example, an object file containing no-operation instructions may include the data structure and initialization code.

Continuing with FIG. 1, when the post-processing is complete, the object code containing no-operation instructions (116) and the object code with probe encoding (e.g., data structure containing the probe name and location of the probe relocation and tracing framework initialization code) (118) need to be linked together. The linker (120) combines the modified object code (e.g., the object code containing no-operation instructions and the object code with probe encoding) into one embedded file (122). In one embodiment of the invention, the embedded file (122) may be either an executable file or a library file.

Figure 3:
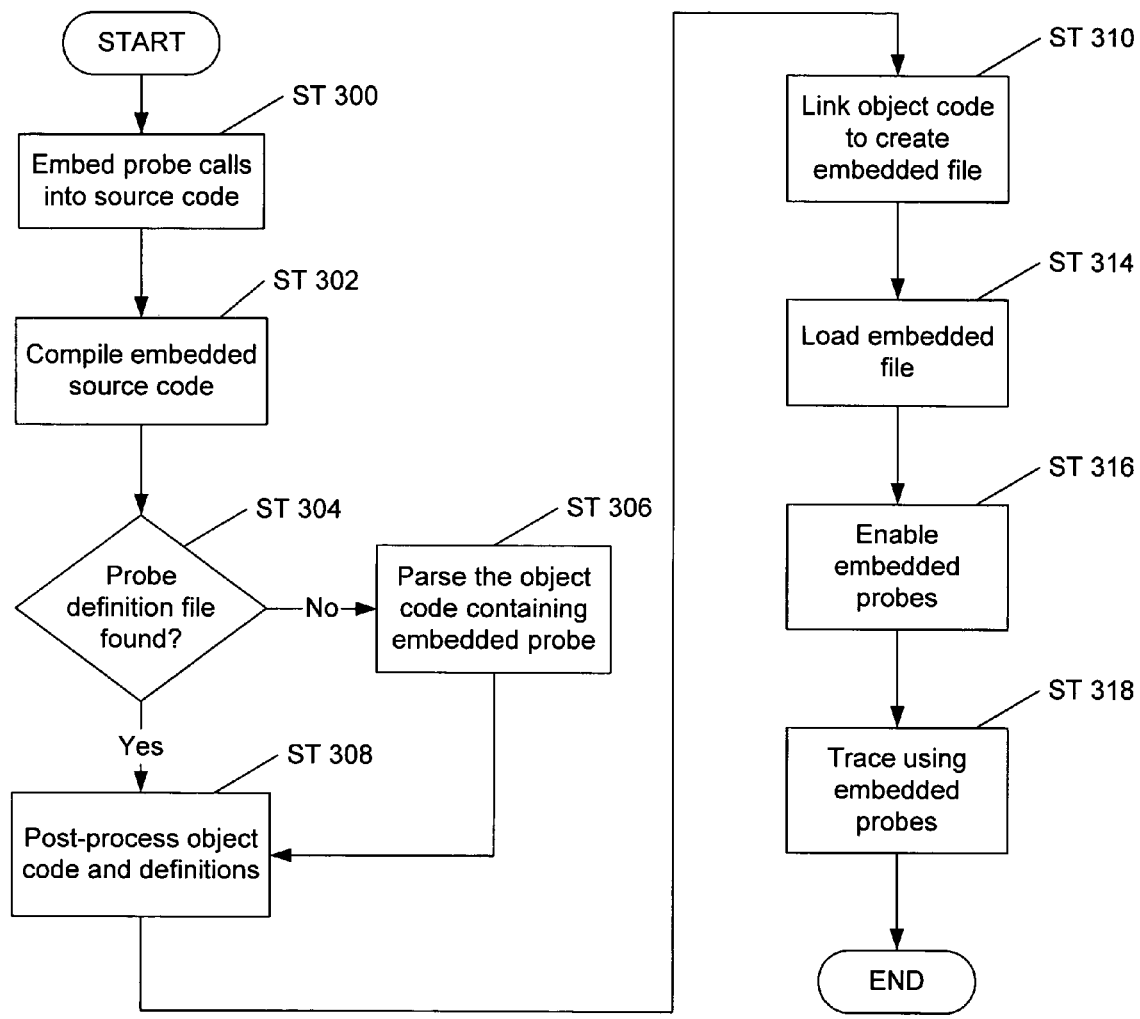
FIG. 3 shows the method of embedding probes into a program and tracing the program in accordance with one embodiment of the invention.
Figure 4:
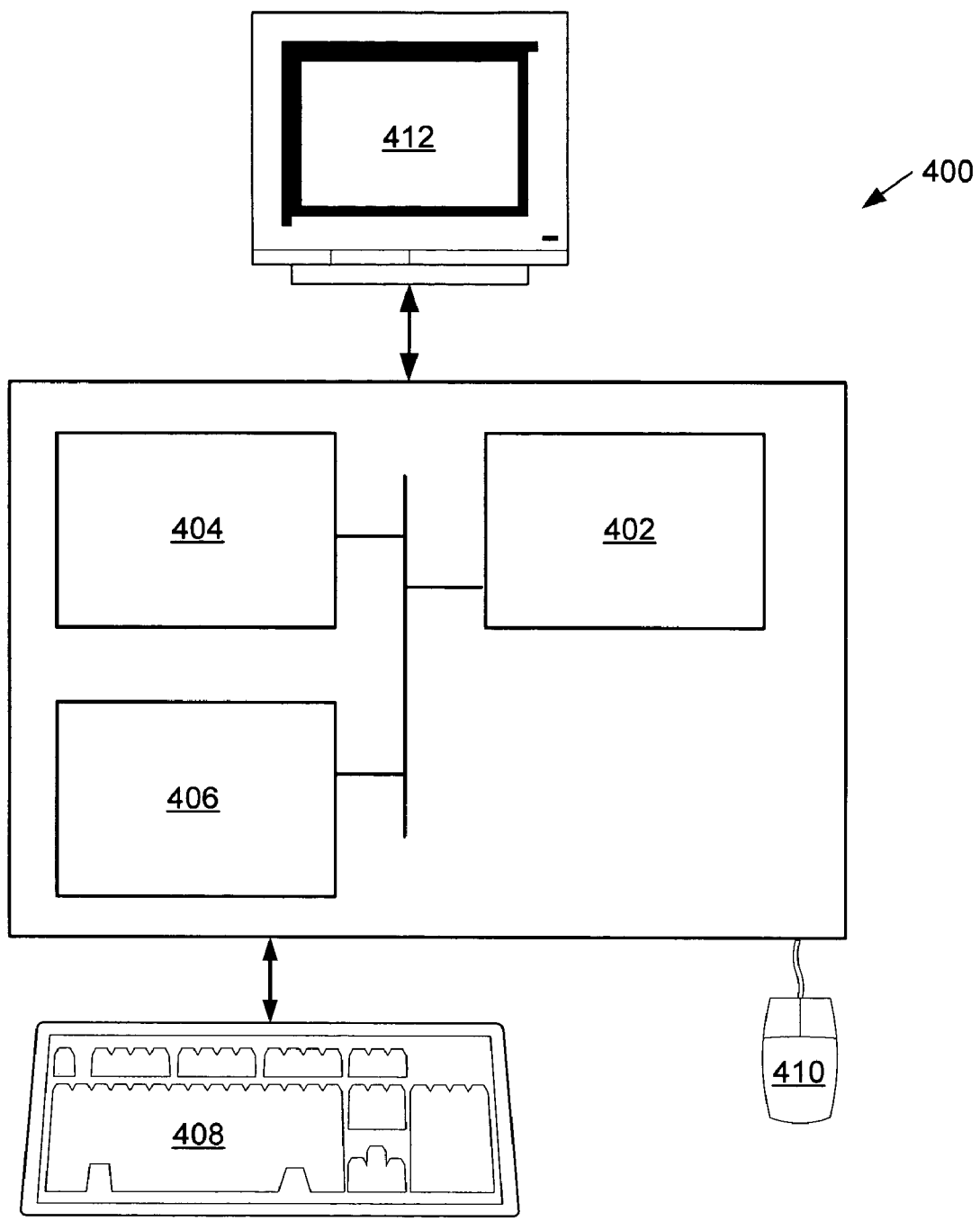
FIG. 4 illustrates a typical computer with components in accordance with other embodiments of the invention.

FIG. 3 illustrates the flow chart for the process of embedding probes into an embedded file and using the embedded file to perform tracing, in accordance with one embodiment of the invention. Initially, the probe calls are embedded into the source code (ST 300). In one embodiment of the invention, the probe calls may be in the form of a function or a macro. Next, as discussed above, the embedded source code is compiled (ST 302). The result of the compilation is an object code file containing probe relocations.

During post-processing (ST 308), the probe relocations are replaced with no-operation instructions and the probe name and location of the probe relocation are recorded. Then, when the program is traced, the code for the probes that are not enabled are not run. Instead, a no-operation instruction is executed. However, if a probe is enabled, the probe triggers at the no-operation instruction, and the code for that probe executes. However, in one embodiment of the invention, a check may be made to determine whether a probe definition file exists (ST 304). If the file does exist, the object code does not need to be parsed to find the probe definitions (ST 306).

When post-processing is complete, a plurality of object files containing no-operation instructions in place of probe relocations exist. In one embodiment of the invention, as discussed above, an object file with the probe encoding also exists after post-processing. To create a complete program, the plurality of object files are linked together into one embedded file (ST 310). In one embodiment of the invention, the embedded file may be an executable file or a library file.

The embedded file contains the embedded probes that can be traced using a tracing framework. The embedded file also contains the code to insert the data structure containing the probe name and location of the probe relocation into the tracing framework (e.g., initialization code). When the embedded file is ready to be traced, the initialization code is loaded (ST 314). If no probes were embedded into the program, then no initialization code will be loaded and the tracing ends execution. After the initialization code is loaded, the enabled probes may be traced. Next, the probes that need to be traced are enabled (ST 316). If no probes are enabled, tracing ends execution. During tracing (ST 318), if a probe is enabled, then the code for that probe is executed when it is triggered, as discussed above.

The invention may be implemented on virtually any type of computer regardless of the platform being used. For example, as shown in FIG. 3, a computer system (400) includes a processor (402), associated memory (404), a storage device (406), and numerous other elements and functionalities typical of today's computers (not shown). The computer (400) may also include input means, such as a keyboard (408) and a mouse (410), and output means, such as a monitor (412). The computer system (400) is connected to a local area network (LAN) or a wide area network (e.g., the Internet) (not shown) via a network interface connection (not shown). Those skilled in the art will appreciate that these input and output means may take other forms.

Further, those skilled in the art will appreciate that one or more elements of the aforementioned computer system (400) may be located at a remote location and connected to the other elements over a network. Further, the invention may be implemented on a distributed system having a plurality of nodes, where each portion of the invention may be located on a different node within the distributed system. In one embodiment of the invention, the node corresponds to a computer system. Alternatively, the node may correspond to a processor with associated physical memory. Further, software instructions to perform embodiments of the invention may be stored on a computer readable medium such as a compact disc (CD), a diskette, a tape, a file, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method of generating an embedded file comprising:
   embedding a plurality of probe calls into source code to obtain embedded source code;
   compiling the embedded source code to generate object code comprising a first probe relocation for each of the plurality of probe calls;
   post processing the object code to obtain a plurality of modified object code, wherein the plurality of modified object code comprises object code comprising a no-operation instruction in place of the probe relocation and object code comprising a probe encoding, and wherein post processing the object code comprises:
   identifying one of the plurality of probe calls associated with the probe relocation;
   replacing the probe call with a no-operation instruction;
   recording a location and name of the probe call into the probe encoding; and
   invalidating the relocation; and
   linking the plurality of modified object code to obtain the embedded file, wherein the embedded file comprises the probe encoding, and wherein the embedded file is an executable file.

2. The method of claim 1, further comprising:
   loading the embedded file into a process address space and inserting probe encoding into a tracing framework using an initialization routine of the embedded file.

3. The method of claim 2, wherein the tracing framework is configured to:
   enable at least one of the plurality of probe calls using the probe encoding; and
   recording activity of the embedded file during execution.

4. The method of claim 1, further comprising:
   tracing the plurality of probe calls in the embedded file using the probe encoding.

5. The method of claim 1, wherein post processing the object code further comprises accepting a probe definition file to supply probe call information.

6. The method of claim 1, wherein the probe encoding is stored in a data structure and embedded into the embedded file.

7. The method of claim 1, wherein the object code comprises probe definitions to supply probe call information.

8. The method of claim 1, wherein probe encoding comprises one selected from the group consisting of probe call information and code to load the probe call information into the tracing framework.

9. A system for executing an embedded file comprising:
   a processor executing:
      a compiler configured to accept embedded source code and generate object code comprising:
         a probe relocation for each of the plurality of probe calls;
      a post-processor configured to obtain a plurality of modified object code, wherein the plurality of modified object code comprises object code containing no-operation instructions and object code containing probe encoding, wherein obtaining a plurality of modified object code comprises: identify one of the plurality of probe calls associated with the relocation; replace the probe call with a no-operation instruction; record a location and name of the probe call into a probe encoding; and invalidate the relocation;
      a linker configured to link the plurality of modified object code to obtain an embedded file, wherein the embedded file comprises the probe encoding, and wherein the embedded file is an executable file;
      and a tracing framework configured to accept probe encoding of the embedded file and trace the plurality of probe calls based on information in probe encoding.

10. The system of claim 9, wherein the tracing framework is configured to:
    enable at least one of the plurality of probe calls; and
    record activity of the embedded file during execution.

11. The system of claim 9, wherein the post processor is further configured to accept a probe definition file to supply probe call information.

12. The system of claim 9, wherein the probe encoding is stored in a data structure and embedded into the embedded file.

13. The system of claim 9, wherein the object code comprises probe definitions to supply probe call information.

14. The system of claim 9, wherein probe encoding comprises one selected from the group consisting of probe call information and code to load the probe call information into the tracing framework.

15. A computer system for configuring a link aggregation module, comprising:
   a processor;
   a memory;
   a storage device; and
   software instructions stored in the memory for enabling the computer system under control of the processor to:
      embed a plurality of probe calls into source code to obtain embedded source code;
      compile the embedded source code to generate object code comprising a probe relocation for each of the plurality of probe calls;
      post process the object code to obtain a plurality of modified object code, wherein the plurality of modified object code comprises object code containing no-operation instructions in place of the relocations and object code containing probe encoding, and wherein post processing the object code comprises:
         identifying one of the plurality of probe calls associated with the probe relocation;
         replacing the probe call with a no-operation instruction;
         recording a location and name of the probe call into a probe encoding; and
         invalidating the relocation; and
      link the plurality of modified object code to obtain an embedded file, wherein the embedded file comprises the probe encoding, wherein the embedded file is an executable file, and
      wherein the embedded file is loaded into a process address space and inserting the probe encoding into a tracing framework using an initialization routine of the embedded file.

16. A computer readable medium comprising software instructions, wherein the software instructions comprise functionality to:
   embed a plurality of probe calls into source code to obtain embedded source code;
   compile the embedded source code to generate object code comprising a probe relocation for each of the plurality of probe calls;
   post process the object code to obtain a plurality of modified object code, wherein the plurality of modified object code comprises object code containing no-operation instructions in place of the relocations and object code containing probe encoding, and wherein post processing the object code comprises:
      identifying one of the plurality of probe calls associated with the probe relocation;
      replacing the probe call with a no-operation instruction;
      recording a location and name of the probe call into a probe encoding; and
      invalidating the relocation; and
   link the plurality of modified object code to obtain an embedded file, wherein the embedded file comprises the probe encoding, wherein the embedded file comprises an executable file, and
   wherein the embedded file is loaded into a process address space and inserting the probe encoding into a tracing framework using an initialization routine of the embedded file.

* * * * *